US012618690B2

(12) United States Patent 　 (10) Patent No.: US 12,618,690 B2
Yamauchi 　 (45) Date of Patent: May 5, 2026

(54) ORIENTATION CALCULATION APPARATUS, ORIENTATION CALCULATION METHOD, IMAGING APPARATUS INCLUDING ORIENTATION CALCULATION APPARATUS, AND METHOD FOR CONTROLLING SAME

(71) Applicant: CANON KABUSHIKI KAISHA, Tokyo (JP)

(72) Inventor: Masaki Yamauchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 265 days.

(21) Appl. No.: 18/341,135

(22) Filed: Jun. 26, 2023

(65) Prior Publication Data

US 2023/0417575 A1 　 Dec. 28, 2023

(30) Foreign Application Priority Data

Jun. 27, 2022 　 (JP) .................................. 2022-102632

(51) Int. Cl.
G01C 23/00 　 (2006.01)
G01P 13/00 　 (2006.01)
(52) U.S. Cl.
CPC .............. G01C 23/00 (2013.01); G01P 13/00 (2013.01)
(58) Field of Classification Search
CPC .................................. G01C 23/00; G01P 13/00
See application file for complete search history.

(56) References Cited

U.S. PATENT DOCUMENTS 7,092,109 B2 * 8/2006 Satoh ................... G01B 11/002
　 348/169
8,520,931 B2 * 8/2013 Tateno ................. G06V 20/647
　 382/101
8,682,106 B2 * 3/2014 Kotake ................. G06V 10/24
　 382/285
11,361,465 B2 　 6/2022 Hirama
2020/0342618 A1 　 10/2020 Hirama

FOREIGN PATENT DOCUMENTS

JP 　 2020181059 A 　 11/2020
JP 　 2022069993 A 　 5/2022

* cited by examiner

*Primary Examiner* — Elias Desta
(74) *Attorney, Agent, or Firm* — Canon U.S.A., Inc. IP Division

(57) ABSTRACT

An orientation calculation apparatus includes one or more processors and one or more memories that are configured to obtain detection signals from a first and a second sensor configured to detect the movement of the moving apparatus; calculate, as a first calculation, first orientation information about the moving apparatus; calculate, as a second calculation, second orientation information about the moving apparatus; determine which calculation to calculate an orientation of the moving apparatus is used as a determination; and update the reference angle. The reference angle is updated in synchronization with a timing when the one or more processors and the one or more memories determine that a state where the determination is to be switched from a state where the orientation of the moving apparatus is calculated using the second calculation to a state where the orientation is calculated using the first calculation.

20 Claims, 9 Drawing Sheets

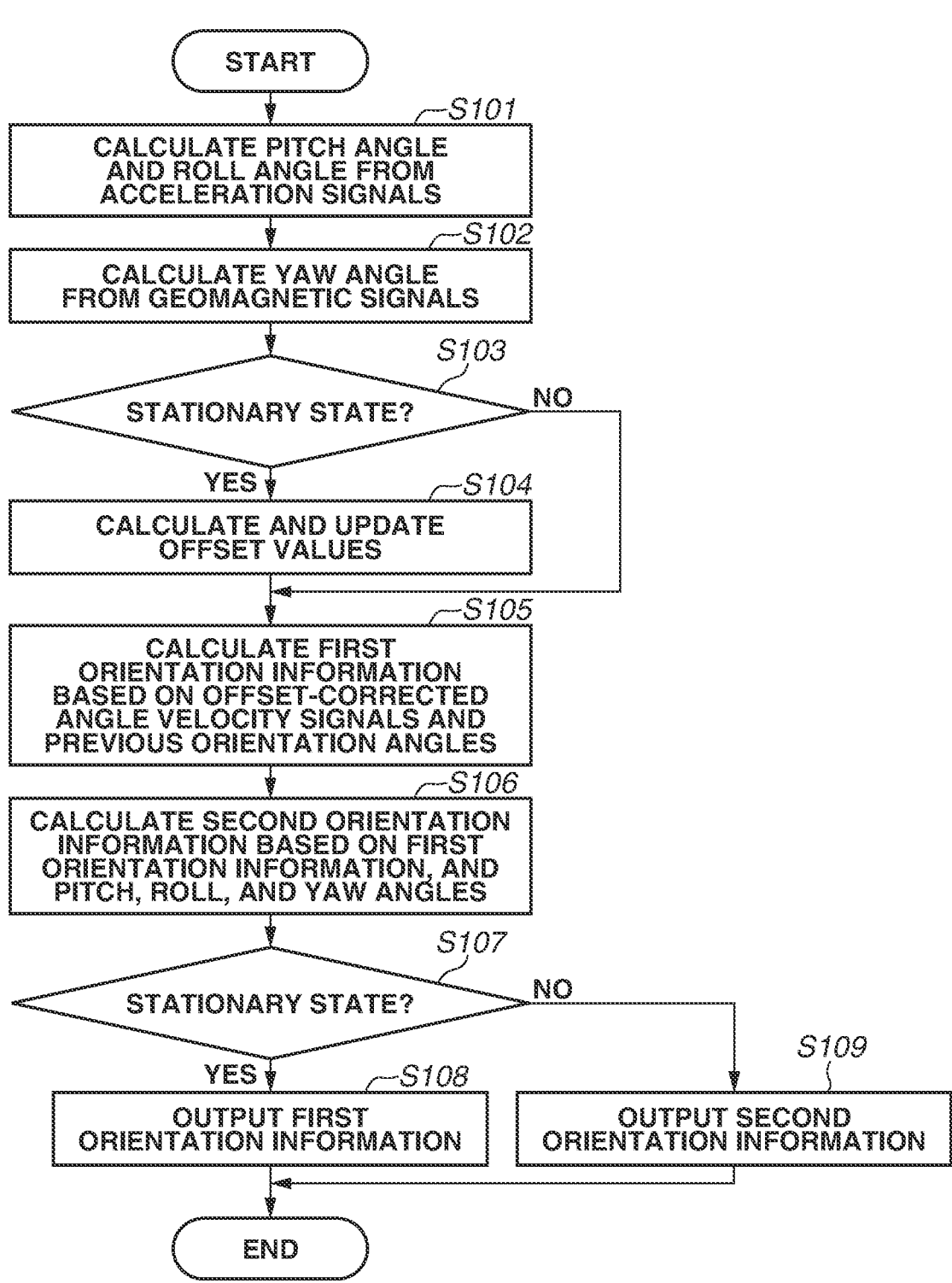

START

S101
CALCULATE PITCH ANGLE
AND ROLL ANGLE FROM
ACCELERATION SIGNALS

S102
CALCULATE YAW ANGLE
FROM GEOMAGNETIC SIGNALS

S103
STATIONARY STATE?          NO

YES

S104
CALCULATE AND UPDATE
OFFSET VALUES

S105
CALCULATE FIRST
ORIENTATION INFORMATION
BASED ON OFFSET-CORRECTED
ANGLE VELOCITY SIGNALS AND
PREVIOUS ORIENTATION ANGLES

S106
CALCULATE SECOND ORIENTATION
INFORMATION BASED ON FIRST
ORIENTATION INFORMATION, AND
PITCH, ROLL, AND YAW ANGLES

S107
STATIONARY STATE?          NO

YES                        S109

S108
OUTPUT FIRST
ORIENTATION INFORMATION

OUTPUT SECOND
ORIENTATION INFORMATION

END

ANGLE

TRUE ANGLE

ANGLE OUTPUT

---- ANGULAR VELOCITY ANGLE
—— KALMAN FILTER OUTPUT ANGLE

ANGLE OUTPUT

—— OUTPUT ANGLE

FIG.7

ANGLE

D2

D1

T0     T1     TIME     T2

TRUE ANGLE

ANGLE
OUTPUT

D3

D2

D1

T0     T1     TIME     T2

- - - - ANGULAR VELOCITY ANGLE
——— KALMAN FILTER OUTPUT ANGLE

ANGLE
OUTPUT

D3

D2

D1

T0     T1     TIME     T2

——— OUTPUT ANGLE

ORIENTATION CALCULATION APPARATUS, ORIENTATION CALCULATION METHOD, IMAGING APPARATUS INCLUDING ORIENTATION CALCULATION APPARATUS, AND METHOD FOR CONTROLLING SAME

BACKGROUND

Field of the Disclosure

The present disclosure relates to a technique for calculating orientation using a plurality of sensors for detecting movement.

Description of the Related Art

Some imaging apparatuses such as a video camera have a function of calculating a change in relative orientation from the output of an angular velocity sensor implemented therein. The orientation of an imaging apparatus is expressed by angles about three orthogonal axes, and the amount of change in orientation (angles) due to movement can be calculated by integrating angular velocity that is the output of the angular velocity sensor. However, the angular velocity sensor characteristically changes in the output in a low frequency band in particular due to temperature variations. As the temperature changes, the orientation obtained by integrating the angular velocity therefore deviates from the true value. Methods for reducing errors in the calculated angles of orientation due to a change in the output of the angular velocity sensor by using other types of sensors capable of detecting the movement of the imaging apparatus, such as an acceleration sensor and a geomagnetic sensor, in combination have thus been discussed.

Japanese Patent Application Laid-Open No. 2020-181059 discusses an orientation angle calculation apparatus that calculates an angle of an imaging apparatus by combining the output signals of an angular velocity sensor with those of an acceleration sensor and a geomagnetic sensor.

The outputs of the acceleration sensor and the geomagnetic sensor are less affected by errors in a low frequency band than the output of the angular velocity sensor, but may contain a lot of high frequency noise. The accuracy of the calculated orientation angles can thus drop if the output signals of such sensors are constantly used.

SUMMARY

According to an aspect of the present disclosure, an orientation calculation apparatus includes one or more memories and one or more processors that are configured to obtain detection signals from a first sensor configured to detect movement of a moving apparatus and a second sensor configured to detect the movement of the moving apparatus on a same axis as that of the movement detected by the first sensor; calculate, as a first calculation, first orientation information about the moving apparatus based on an output of the first sensor and a reference angle calculate, as a second calculation, second orientation information about the moving apparatus by a method different from that for the first calculation based on the output of the first sensor and an output of the second sensor; determine which calculation to calculate an orientation of the moving apparatus is to be used, from among a plurality of calculations including the first calculation and the second calculation, as a determination; and update the reference angle. The reference angle is updated in synchronization with a timing when the one or more processors and the one or more memories determine that a state where the determination is to be switched from a state where the orientation of the moving apparatus is calculated using the second calculation to a state where the orientation of the moving apparatus is calculated using the first calculation.

Further features of various embodiments will become apparent from the following description of exemplary embodiments with reference to the attached drawings.

BRIEF DESCRIPTION OF THE DRAWINGS

FIG. 1 is a block diagram of a camera according to a first exemplary embodiment.

FIG. 5 is a flowchart illustrating processing by the orientation calculation unit according to the present exemplary embodiment.

FIG. 7 illustrates the configuration of an orientation calculation unit according to a second exemplary embodiment.

DESCRIPTION OF THE EMBODIMENTS

Figure 2A:
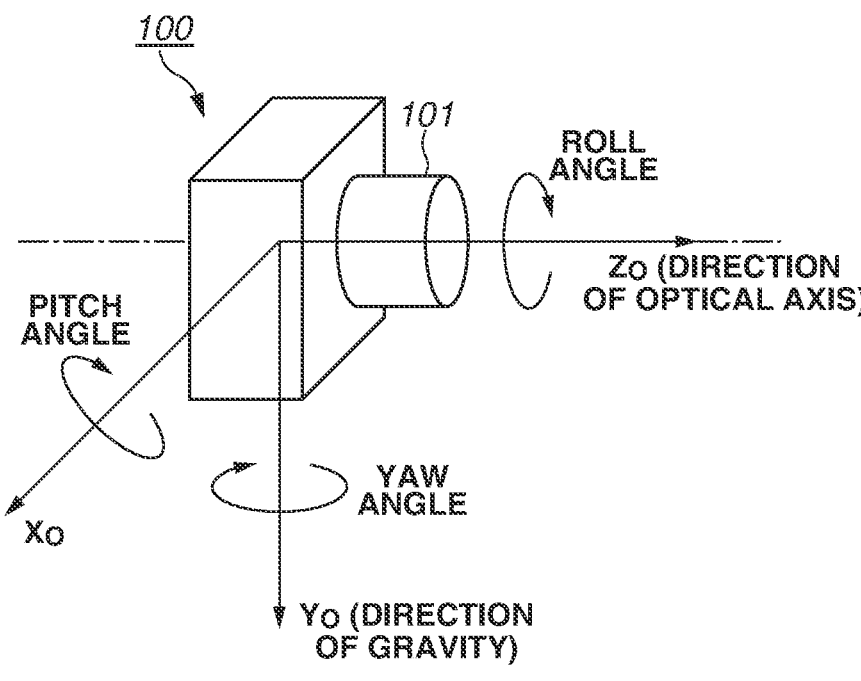
FIG. 2A is a conceptual diagram for describing an absolute coordinate system.

Exemplary embodiments of the present disclosure will be described in detail below with reference to the attached drawings. In the drawings, similar members are denoted by the same reference numerals. A redundant description thereof will be omitted. The following exemplary embodiments are not intended to limit the claims. While a plurality of features is described in the exemplary embodiments, some embodiments do not include every one of the plurality of features, and the features may be combined in any given way.

In a first exemplary embodiment, a configuration where a camera 100 (including a video camera) that is an imaging apparatus that includes an orientation calculation apparatus inside will be described with reference to the drawings. The present exemplary embodiment deals with an orientation calculation apparatus capable of calculating accurate orientation angles in calculating orientation angles using a plurality of sensors.

Figure 1:
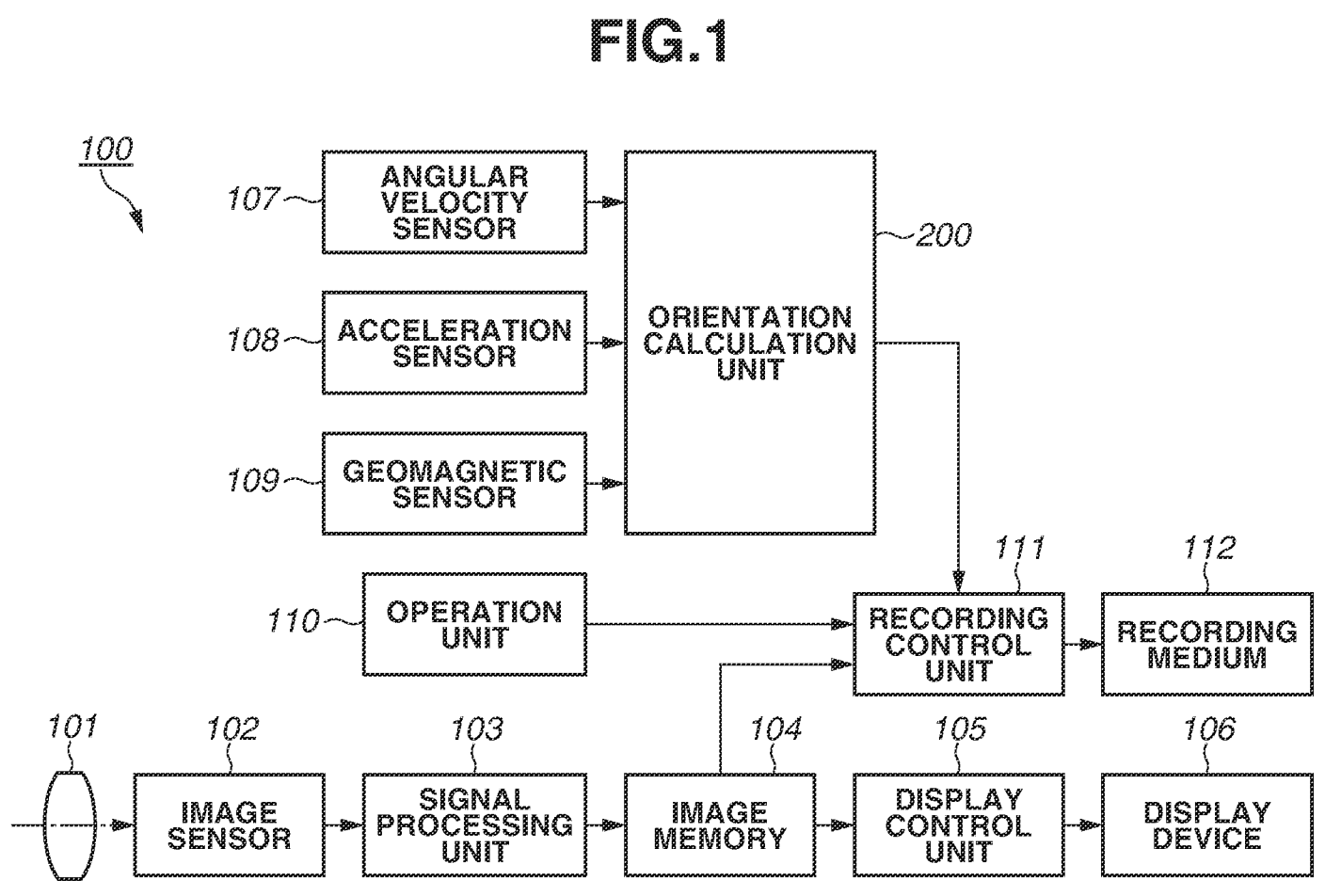

FIG. 1 is a block diagram illustrating a configuration of the camera 100 according to the present exemplary embodiment. The camera 100 is a lens-integrated digital camera for mainly capturing still images and moving images. However, the range of application of the exemplary embodiments is not limited to lens-integrated digital cameras, and the present exemplary embodiments are similarly applicable to interchangeable lens digital cameras. The exemplary embodiments can also be applied to various imaging systems other than digital cameras.

An imaging lens 101 is an imaging optical system. For the sake of simplicity, FIG. 1 illustrates only one lens, whereas a zoom lens for zooming, an image shake correction lens, such as a shift lens for image shake correction, and a focus lens for focus adjustment can be included. With such a configuration, the imaging lens 101 forms an object image on an image sensor 102.

The image sensor 102 captures the object image formed by the imaging lens 101.

The image sensor 102 photoelectrically converts the object image to accumulate electrical charges, and reads the charges to output an image signal including a plurality of pixels to a signal processing unit 103. The image sensor 102 includes a complementary metal-oxide-semiconductor (CMOS) image sensor, for example.

The signal processing unit 103 applies signal processing, such as white balance adjustment and gamma correction, to the image signal output from the image sensor 102 to generate a video signal including frame-by-frame image signals, and stores the video signal in an image memory 104. A display control unit 105 reads the video signal stored in the image memory 104 and displays an image on a display device 106. The display device 106 is a device capable of displaying images. For example, the display device 106 includes a liquid crystal display (LCD) panel.

An angular velocity sensor 107 is a sensor for detecting the angular velocity of a movement (vibration) acting on the camera 100, and functions as an angular velocity detection unit that detects angular velocities about three orthogonal detection axes, respectively. Details of the detection axes will be described below. An example of the angular velocity sensor 107 is a gyro sensor. As employed in the present exemplary embodiment and this specification, a sensor that detects the angular velocity of the movement acting on the camera 100, like the angular velocity sensor 107, is also referred to as detecting the movement of the camera 100. The angular velocity sensor 107 may include three separate angular velocity sensors that detect angular velocities about the respective detection axes, or may be integrated into a single unit. The angular velocity sensor 107 outputs angular velocity signals that are detection signals to an orientation calculation unit 200.

An acceleration sensor 108 is a sensor for detecting the acceleration of the movement (vibration) acting on the camera 100, and functions as an acceleration detection unit that detects acceleration on the three orthogonal detection axes. The direction of gravity can thereby be detected. As employed in the present exemplary embodiment and this specification, a sensor that detects the acceleration of the movement acting on the camera 100, like the acceleration sensor 108, is also referred to as detecting the movement of the camera 100. The acceleration sensor 108 may include three separate acceleration sensors that detect acceleration about the respective detection axes, or may be integrated into a single unit. The acceleration sensor 108 outputs acceleration signals that are detection signals to the orientation calculation unit 200.

A geomagnetic sensor 109 is a sensor for detecting the magnetism acting on the camera 100, and functions as a geomagnetism detection unit that detects the direction of the geomagnetism by detecting the magnetism on the three orthogonal detection axes. The geomagnetic sensor 109 is not a sensor that detects the movement itself of the camera 100, but the geomagnetic sensor 109 can detect the movement of the camera 100 based on a change in the direction of the geomagnetism. As employed in the present exemplary embodiment and this specification, a sensor that detects the direction of the geomagnetism acting on the camera 100, like the geomagnetic sensor 109, is also referred to as detecting the movement of the camera 100. The geomagnetic sensor 109 may include three separate geomagnetic sensors that detect the geomagnetism about the respective detection axes, or may be integrated into a single unit. The geomagnetic sensor 109 outputs geomagnetic signals that are detection signals to the orientation calculation unit 200.

The orientation calculation unit 200 performs calculation processing using the angular velocity signals output from the angular velocity sensor 107, the acceleration signals output from the acceleration sensor 108, and the geomagnetic signals output from the geomagnetic sensor 109. The orientation calculation unit 200 thereby calculates the current angles of the camera 100 (hereinafter, the current angles may be referred to as orientation angles) with respect to reference angles as information indicating the orientation of the camera 100 (hereinafter, this information may be referred to as orientation information).

A detailed orientation calculation method implemented by the orientation calculation unit 200 will be described below. The orientation calculation unit 200 outputs the calculated orientation information to a recording control unit 111.

An operation unit 110 obtains operation information about a start and a stop of video image (moving image) recording based on a user's camera operations. The operation unit 110 includes a touchscreen and switches, for example.

The recording control unit 111, if instructed to record a video image by the operation unit 110, outputs the video signal stored in the image memory 104 and the orientation information output from the orientation calculation unit 200 to a recording medium 112 in synchronization with each other, whereby the video signal and the orientation information are recorded on the recording medium 112. The recording medium 112 may be one built in the camera 100 or a portable one. The recording medium 112 is a semiconductor memory or a hard disk, for example.

Figure 2B:
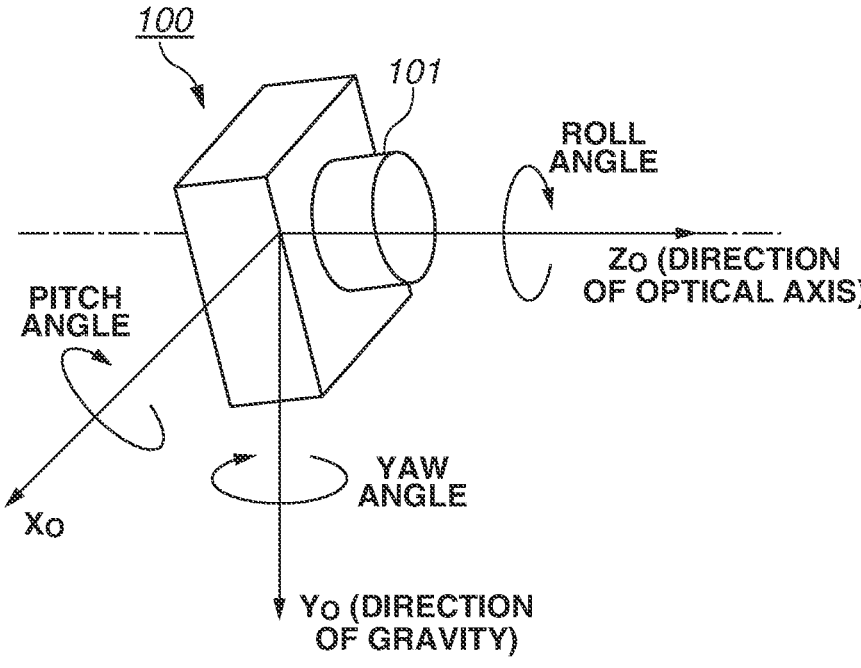
FIG. 2B is a conceptual diagram for describing the absolute coordinate system.

FIGS. 2A and 2B are diagrams illustrating an absolute coordinate system for expressing the orientation of the camera 100. The absolute coordinate system consists of three orthogonal axes. In the present exemplary embodiment, the three axes of the absolute coordinate system are denoted by $X_O$, $Y_O$, and $Z_O$. An eastward direction is defined as the $X_O$ axis, the direction of gravity as the $Y_O$ axis, and a northward direction as the $Z_O$ axis. The angle of rotation about the $X_O$ axis in the absolute coordinate system will be referred to as a pitch angle, the angle of rotation about the $Y_O$ axis will be referred to as a yaw angle, and the angle of rotation about the $Z_O$ axis will be referred to as a roll angle.

FIG. 2A is a diagram illustrating a relationship between the camera 100 and the absolute coordinates when the camera 100 is in a first orientation. FIG. 2B is a diagram illustrating the relationship between the camera 100 and the absolute coordinates when the orientation of the camera 100 has changed from the first orientation. The directions of the axes of the absolute coordinate system remain unchanged even if the orientation of the camera 100 (including the sensors mounted thereon) has changed.

In the present exemplary embodiment, a description will be given on the assumption that the orientation angles (pitch, yaw, and roll angles) in the first orientation where the optical axis of the imaging lens 101 falls on the $Z_O$ axis and the horizontal direction of the camera 100 on the $X_O$ axis as illustrated in FIG. 2A are zero angles. The angles of displacement with respect to the zero angles with the camera 100 in a specific orientation are referred to as initial angles. The initial angles are calculated by an acceleration angle calculation unit 201 and a geomagnetic angle calculation unit 202 to be described below. Relative angles with reference to the initial angles are then calculated as the orientation angles of the camera 100. The specific orientation is not limited in particular, and may be that of the camera 100 upon power-on or at the beginning of video image recording, for example. In such cases, the initial angles refer to the respective angles of displacement upon the power-on of the camera 100 or those at the beginning of the video image recording.

Figure 3A:
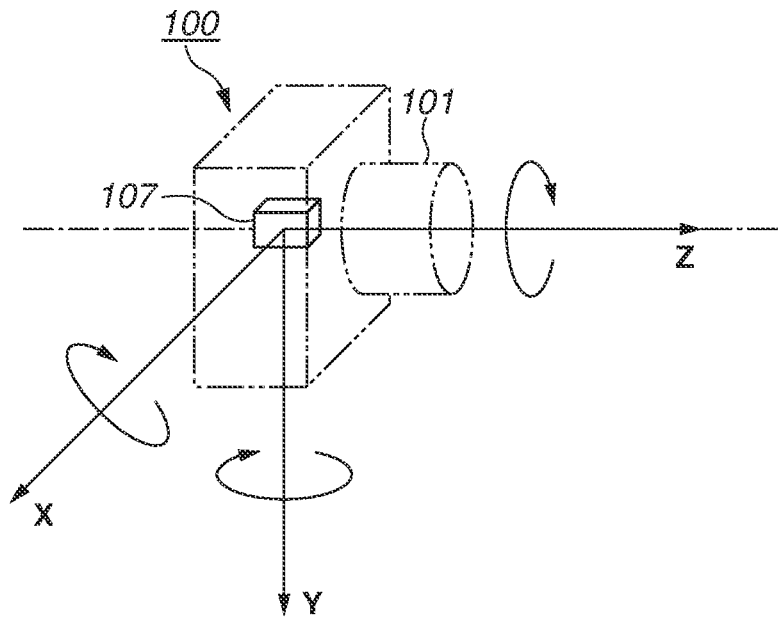
FIG. 3A is a conceptual diagram for describing a sensor coordinate system.
Figure 3B:
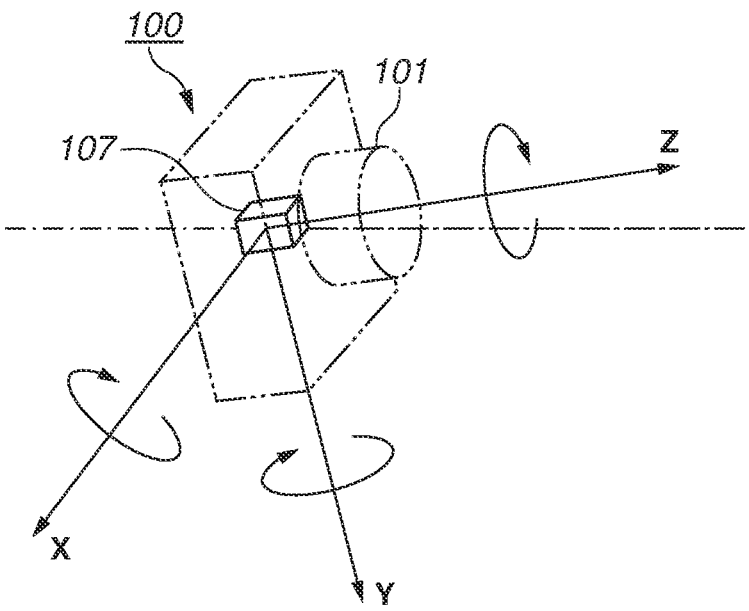
FIG. 3B is a conceptual diagram for describing the sensor coordinate system.

FIGS. 3A and 3B are diagrams illustrating a sensor coordinate system for expressing the detection direction of the angular velocity sensor 107. The sensor coordinate system consists of three orthogonal axes. In the present exemplary embodiment, the three axes of the sensor coordinate system are denoted by X, Y, and Z. The angular velocity sensor 107 detects the velocity of the angles of rotation about the X, Y, and Z axes. With the camera 100 in the foregoing first orientation, the X, Y, and Z axes of the sensor coordinate system) are in the same directions as those of the $X_O$, $Y_O$, and $Z_O$ axes of the absolute coordinate system, respectively.

FIG. 3A is a diagram illustrating a relationship between the camera 100 and the sensor coordinates when the camera 100 to which the angular velocity sensor 107 is fixed is in the first orientation (at the beginning of video image recording). FIG. 3B is a diagram illustrating the relationship between the camera 100 and the sensor coordinates when the orientation of the camera 100 has changed from the first orientation. As the orientation of the camera 100 changes, the sensor coordinate system rotates by a rotation angle corresponding to the change, and the directions of the respective axes (X, Y, and Z) change. To calculate the orientation of the camera 100 from the output of the angular velocity sensor 107, the output will therefore be converted from the sensor coordinate system into the absolute coordinate system. The conversion method will be described below.

While only the angular velocity sensor 107 has been described with reference to FIGS. 3A and 3B, the outputs of the acceleration sensor 108 and the geomagnetic sensor 109 are also expressed on the sensor coordinate system, and will therefore be converted into the absolute coordinate system. In the present exemplary embodiment, the detection axes of the angular velocity sensor 107, the acceleration sensor 108, and the geomagnetic sensor 109 are assumed to be in line with the axes X, Y, Z, respectively. If the detection axes of the sensors deviate from each other, the orientation can be similarly detected by correcting the deviations.

The calculation of the orientation information by the orientation calculation unit 200 will now be described. The orientation calculation unit 200 includes a first calculation unit and a second calculation unit that calculate orientation information using respective different methods. The orientation calculation unit 200 determines whether the orientation information calculated by either calculation unit is selected as the orientation information about the camera 100 based on the magnitude of the movement of the camera 100, and outputs the orientation information. With a small movement of the camera 100, the orientation calculation unit 200 selects the first calculation unit. The first calculation unit calculates orientation information based on the output of the angular velocity sensor 107 that produces less noise components in a high frequency band but is more likely to cause errors in a low frequency band and changes in the errors than the acceleration sensor 108 and the geomagnetic sensor 109. With a large movement of the camera 100, the orientation calculation unit 200 selects the second calculation unit. The second calculation unit calculates orientation information based also on the outputs of the acceleration sensor 108 and the geomagnetic sensor 109 in addition to that of the angular velocity sensor 107. In such a manner, the orientation calculation unit 200 calculates the orientation by using the acceleration sensor 108 and the geomagnetic sensor 109 as well in situations where errors are likely to occur in calculating the orientation information based only on the output of the angular velocity sensor 107. The orientation information where the effect of errors in the low frequency band and noise components in the high frequency band is reduced can thus be calculated.

Figure 4:
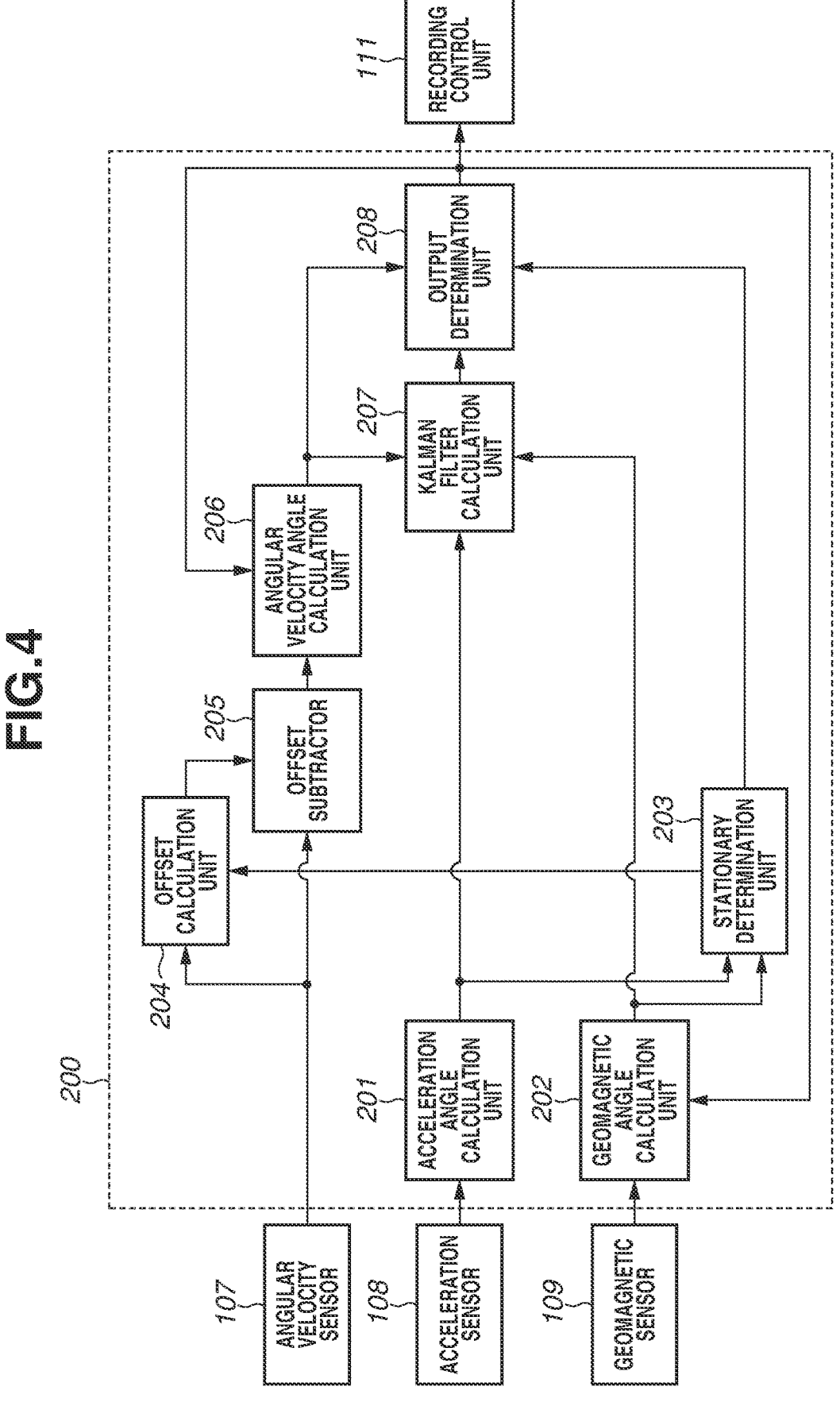
FIG. 4 is a block diagram of an orientation calculation unit according to the exemplary embodiment.

The calculation of the orientation information by the orientation calculation unit 200 will be described in detail with reference to FIGS. 4 and 5. FIG. 4 is a block diagram illustrating a configuration of the orientation calculation unit 200. FIG. 5 is a flowchart illustrating a processing procedure by the orientation calculation unit 200. The processing illustrated in FIG. 5 is repeated at a predetermined period.

The blocks constituting the orientation calculation unit 200 will be described. The acceleration angle calculation unit 201 calculates a pitch angle $\theta_A$ and a roll angle $\varphi_A$ in the absolute coordinate system from X-, Y-, and Z-axis acceleration signals $A_x$, $A_y$, and $A_z$ in the sensor coordinate system, output from the acceleration sensor 108, by the following Eqs. 1 and 2:

$$\theta_A = \tan^{-1}\frac{-A_z}{\sqrt{A_x^2 + A_y^2}} \tag{Eq. 1}$$

$$\varphi_A = \tan^{-1}\frac{A_x}{A_z} \tag{Eq. 2}$$

The calculations are output to a stationary determination unit 203 and a Kalman filter calculation unit 207.

The geomagnetic angle calculation unit 202 calculates the yaw angle in the absolute coordinate system from X-, Y-, and Z-axis geomagnetic signals $M_x$, $M_y$, and $M_z$ in the sensor coordinate system, output from the geomagnetic sensor 109. The geomagnetic angle calculation unit 202 initially calculates $X_O$-, $Y_O$-, and $Z_O$-axis geomagnetic signals $M_x'$, $M_y'$, and $M_z'$ in the absolute coordinate system from the geomagnetic signals $M_x$, $M_y$, and $M_z$ expressed in the sensor coordinate system and orientation angles (yaw, pitch, and roll angles $\psi$, $\theta$, and $\varphi$) output from an output determination unit 208, to be described below, by using the following Eq. 3:

$$\begin{bmatrix} M_z' \\ M_x' \\ M_y' \end{bmatrix} = \begin{bmatrix} \cos\theta & \sin\varphi\sin\theta & \cos\varphi\sin\theta \\ 0 & \cos\varphi & -\sin\varphi \\ -\sin\theta & \sin\varphi\cos\theta & \cos\varphi\cos\theta \end{bmatrix} \begin{bmatrix} M_z \\ M_x \\ M_y \end{bmatrix}. \tag{Eq. 3}$$

The orientation angles ψ, θ, and φ output from the output determination unit 208 may be referred to as third orientation information.

The geomagnetic angle calculation unit 202 calculates a yaw angle $\psi_M$ from the calculated geomagnetic signals in the absolute coordinate system by Eq. 4:

$$\psi_M = \tan^{-1}\left(-\frac{M_x'}{M_z'}\right). \qquad \text{(Eq. 4)}$$

The calculation is output to the stationary determination unit 203 and the Kalman filter calculation unit 207.

The stationary determination unit 203 functions as a determination unit that determines the state of movement occurring on the camera 100 using the pitch angle $\theta_A$ and the roll angle $\varphi_A$ output from the acceleration angle calculation unit 201 and the yaw angle WM output from the geomagnetic angle calculation unit 202. The stationary determination unit 203 according to the present exemplary embodiment determines whether the camera 100 is stationary as the state of movement, and outputs the determination result (stationary state/nonstationary state) to an offset calculation unit 204 and the output determination unit 208. For example, the stationary determination unit 203 determines that the camera 100 is in the stationary state if output varying widths of the pitch angle $\theta_A$, the roll angle $\varphi_A$, and the yaw angle $\psi_M$ in a predetermined time fall within respective predetermined values. The stationary determination unit 203 determines the state of movement occurring on the camera 100 based on the outputs of the acceleration sensor 108 and the geomagnetic sensor 109 that cause smaller errors in the low frequency band than the angular velocity sensor 107. The state of movement can thus be determined more accurately than based on the output of the angular velocity sensor 107.

The offset calculation unit 204 calculates offset values included in the angular velocity signals output from the angular velocity sensor 107. The offset values calculated by the offset calculation unit 204 will hereinafter be referred to as offset calculation values. In the present exemplary embodiment, new offset values are calculated and output to update the offset calculation values only if the camera 100 is determined to be in the stationary state by the stationary determination unit 203. On the other hand, if the camera 100 is determined to be in the nonstationary state, the offset values are not calculated or updated, and the previous offset calculation values are output. In the present exemplary embodiment, the offset calculation values are averages of the angular velocity signals output in a predetermined period. Alternatively, low frequency band components extracted by applying low-pass filter processing to the angular velocity signals output in a predetermined period may be output as the offset calculation values instead of the averages.

An offset subtractor 205 subtracts the offset calculation values output from the offset calculation unit 204 from the angular velocity signals output from the angular velocity sensor 107, and outputs the resulting offset-corrected angular velocity signals to an angular velocity angle calculation unit 206.

The angular velocity angle calculation unit 206 functions as a first calculation unit that calculates orientation information about the camera 100 based on the angular velocity. The angular velocity angle calculation unit 206 calculates the orientation angles of the camera 100 in the absolute coordinate system based on the offset-corrected angular velocity signals output from the offset subtractor 205 and the orientation angles output from the output determination unit 208 to be described below, and outputs the calculated orientation angles. The orientation angles (yaw, pitch, and roll angles $\psi_G$, $\theta_G$, and $\varphi_G$) calculated by the angular velocity angle calculation unit 206 may hereinafter be referred to as first orientation information.

A method for calculating the orientation angles of the camera 100 in the absolute coordinate system by the angular velocity angle calculation unit 206 will be described. The angular velocity angle calculation unit 206 initially converts the offset-corrected angular velocity signals (yaw, pitch, and roll angular velocity signals $\omega_y$, $\omega_x$, and $\omega_z$) expressed in the sensor coordinate system into yaw, pitch, and roll angular velocity signals $\dot{\psi}_G$, $\dot{\theta}_G$, and $\dot{\varphi}_G$ in the absolute coordinate system using the orientation angles ψ, θ, and φ output from the output determination unit 208, to be described below, as expressed by the following Eq. 5:

$$\begin{bmatrix} \dot{\psi}_G \\ \dot{\theta}_G \\ \dot{\varphi}_G \end{bmatrix} = \begin{bmatrix} 0 & \sin\varphi\sec\theta & \cos\varphi\sec\theta \\ 0 & \cos\varphi & -\sin\varphi \\ 1 & \sin\varphi\tan\theta & \cos\varphi\tan\theta \end{bmatrix} \begin{bmatrix} \omega_z \\ \omega_x \\ \omega_y \end{bmatrix}. \qquad \text{(Eq. 5)}$$

Next, the angular velocity angle calculation unit 206 integrates the calculated yaw, pitch, and roll angular velocity signals $\dot{\psi}_G$, $\dot{\theta}_G$, and $\dot{\varphi}_G$ in the absolute coordinate system to calculate the orientation angles $\psi_G$, $\theta_G$, and $\varphi_G$ in the absolute coordinate system as expressed by the following Eq. 6:

$$\begin{bmatrix} \psi_{G(t)} \\ \theta_{G(t)} \\ \varphi_{G(t)} \end{bmatrix} = \begin{bmatrix} \dot{\psi}_{G(t)} \\ \dot{\theta}_{G(t)} \\ \dot{\varphi}_{G(t)} \end{bmatrix} + \begin{bmatrix} \psi_{G(t-1)} \\ \theta_{G(t-1)} \\ \varphi_{G(t-1)} \end{bmatrix}. \qquad \text{(Eq. 6)}$$

The integrators $\psi_{G(t-1)}$, $\theta_{G(t-1)}$, and $\varphi_{G(t-1)}$ of the angular velocity signals at the beginning of the video image recording (t=0) are 0. As the time elapses, the angular velocity signals are detected and the integration of the angular velocity proceeds.

The angular velocity angle calculation unit 206 outputs the calculated orientation angles $\psi_G$, $\theta_G$, and $\varphi_G$ in the absolute coordinate system to the Kalman filter calculation unit 207 and the output determination unit 208.

The Kalman filter calculation unit 207 functions as a second calculation unit that calculates second orientation information using the detection results of the acceleration sensor 108 and the geomagnetic sensor 109 in addition to the orientation angles $\psi_G$, $\theta_G$, and $\varphi_G$ output from the angular velocity angle calculation unit 206. Specifically, the Kalman filter calculation unit 207 inputs the orientation angles $\psi_G$, $\theta_G$, and $\varphi_G$ output from the angular velocity angle calculation unit 206, the pitch angle $\theta_A$ and the roll angle $\varphi_A$ output from the acceleration angle calculation unit 201, and the yaw angle $\psi_M$ output from the geomagnetic angle calculation unit 202 into a Kalman filter. The Kalman filter calculation unit 207 thereby calculates the second orientation information (yaw, pitch, and roll angles $\psi_K$, $\theta_K$, and $\varphi_K$) where the errors included in the respective outputs are reduced.

A method for calculating the second orientation information by the Kalman filter calculation unit 207 will now be described.

The Kalman filter is a filter for estimating an optimum state value in real time using a state equation and an observation equation. Since the Kalman filter is a conventional technique, a detailed description thereof will be omitted. As expressed by Eq. 7, suppose that a state value $x_{(t)}$ of the Kalman filter consists of the orientation angles $\psi_K$, $\theta_K$, and $\varphi_K$ to be determined, and an observation value $y_{(t)}$ consists of the orientation angles $\psi_M$, $\theta_A$, and $\varphi_A$ output from the acceleration angle calculation unit 201 and the geomagnetic angle calculation unit 202. Suppose also that an input value $u_{(t)}$ consists of the orientation angles $\psi_G$, $\theta_G$, and $\varphi_G$ output from the angular velocity angle calculation unit 206. The state equation and the observation equation are given by Eq. 8:

$$x_{(t)} = \begin{bmatrix} \psi_{K(t)} \\ \theta_{K(t)} \\ \varphi_{K(t)} \end{bmatrix}, \; y_{(t)} = \begin{bmatrix} \psi_{M(t)} \\ \theta_{A(t)} \\ \varphi_{A(t)} \end{bmatrix}, \text{ and } u_{(t)} = \begin{bmatrix} \psi_{G(t)} \\ \theta_{G(t)} \\ \varphi_{G(t)} \end{bmatrix}, \text{ and} \qquad \text{(Eq. 7)}$$

$$\begin{cases} x_{(t+1)} = x_{(t)} + u_{(t)} + v_{(t)} \\ \quad\;\; y_{(t)} = x_{(t)} + w_{(t)} \end{cases}. \qquad \text{(Eq. 8)}$$

Here, process noise $v_{(t)}$ and observation noise $w_{(t)}$ are set to appropriate values based on conventional techniques, with possible noise and errors of the sensors (angular velocity sensor 107, acceleration sensor 108, and geomagnetic sensor 109) taken into consideration.

The output determination unit 208 determines which to output as the orientation information about the camera 100, the first orientation information or the second orientation information, depending on the stationary determination result of the camera 100 made by the stationary determination unit 203. The output determination unit 208 then outputs the determined orientation information to the recording control unit 111 as the third orientation information ($\psi$, $\theta$, and $\varphi$). If the stationary determination result indicates that the camera 100 is in the stationary state, the output determination unit 208 outputs the first orientation information ($\psi_G$, $\theta_G$, and $\varphi_G$) output from the angular velocity angle calculation unit 206 as the third orientation information ($\psi$, $\theta$, and $\varphi$). On the other hand, if the stationary determination result indicates that the camera 100 is in the nonstationary state, the output determination unit 208 outputs the second orientation information ($\psi_K$, $\theta_K$, and $\varphi_K$) output from the Kalman filter calculation unit 207 as the third orientation information ($\psi$, $\theta$, and $\varphi$).

A procedure for calculating the orientation information by the orientation calculation unit 200 thus configured will now be described with reference to the flowchart of FIG. 5.

In step S101, the acceleration angle calculation unit 201 initially calculates the pitch angle $\theta_A$ and the roll angle $\varphi_A$ in the absolute coordinate system from the acceleration signals $A_x$, $A_y$, and $A_z$ in the sensor coordinate system, output from the acceleration sensor 108.

In step S102, the geomagnetic angle calculation unit 202 calculates the yaw angle $\psi_M$ in the absolute coordinate system from the geomagnetic signals $M_x$, $M_y$, and $M_z$ in the sensor coordinate system, output from the geomagnetic sensor 109.

In step S103, the stationary determination unit 203 determines whether the camera 100 is stationary, using the pitch angle $\theta_A$ and the roll angle $\varphi_A$ calculated in step S101 and the yaw angle $\psi_M$ calculated in step S102. If the camera 100 is determined to be in the stationary state (YES in step S103), the processing proceeds to step S104. If the camera 100 is determined to not be in the stationary state (to be in the nonstationary state; NO in step S103), the processing proceeds to step S105.

In step S104, the offset calculation unit 204 calculates offset values included in the angular velocity signals output from the angular velocity sensor 107, and updates the offset values calculated the last time in step S104. The processing proceeds to step S105.

In step S105, the angular velocity angle calculation unit 206 calculates the first orientation information ($\psi_G$, $\theta_G$, and $\varphi_G$) about the camera 100 based on the offset-corrected angular velocity signals $\omega_y$, $\omega_x$, and $\omega_z$ and the orientation angles $\psi$, $\theta$, and $\varphi$ output from the output determination unit 208 the last time.

In step S106, the Kalman filter calculation unit 207 calculates the second orientation information ($\psi_K$, $\theta_K$, and $\varphi_K$) based on the first orientation information ($\psi_G$, $\theta_G$, and $\varphi_G$) calculated in step S105 and the pitch angle $\theta_A$, the roll angle $\varphi_A$, and the yaw angle $\psi_M$ output from the acceleration angle calculation unit 201 and the geomagnetic angle calculation unit 202.

In step S107, the output determination unit 208 refers to the result of the determination made by the stationary determination unit 203 in step S103. If the determination result indicates that the camera 100 is in the stationary state (i.e., the processing has reached step S107 via step S104; YES in step S107), the processing proceeds to step S108. If the determination result does not indicate that the camera 100 is in the stationary state (i.e., the processing has reached step S107 not via step S104; NO in step S107), the processing proceeds to step S109.

In step S108, the output determination unit 208 outputs the first orientation information calculated based on the output of the angular velocity sensor 107 as the orientation information about the camera 100. If step S108 is executed, the effect of error components in the low frequency band included in the output of the angular velocity sensor 107 is expected to be sufficiently reduced by the subtraction of the offset calculation values since the camera 100 is in the stationary state. The first orientation information less affected by noise in the high frequency band than the second orientation information is therefore output as the orientation information about the camera 100.

On the other hand, in step S109, the output determination unit 208 outputs the second orientation information calculated based on the outputs of the angular velocity sensor 107, the acceleration sensor 108, and the geomagnetic sensor 109 as the orientation information about the camera 100. If step S109 is executed, the orientation information is calculated based also on the detection results of the acceleration sensor 108 and the geomagnetic sensor 109 since the camera 100 is in the nonstationary state and the low frequency components due to the movement of the camera 100 are difficult to separate from errors.

As has been described above, according to the present exemplary embodiment, the orientation angles of the camera 100 can be calculated while reducing the effect of high frequency noise included in the outputs of the acceleration sensor 108 and the geomagnetic sensor 109 and accurately correcting the effect of temperature-based errors of the angular velocity sensor 107 in the low frequency band or variations in the errors.

A second exemplary embodiment will now be described. In the first exemplary embodiment, the orientation information output from the output determination unit 208 changes from the first orientation information to the second orientation information, or from the second orientation information to the first orientation information at timings when the stationary determination result switches. When the method for calculation of the orientation information switches in such a manner, the output orientation information ($\psi$, $\theta$, and $\phi$) can have errors. This issue will now be described with reference to FIGS. 6A to 6C.

Figures 6A, 6B, 6C:
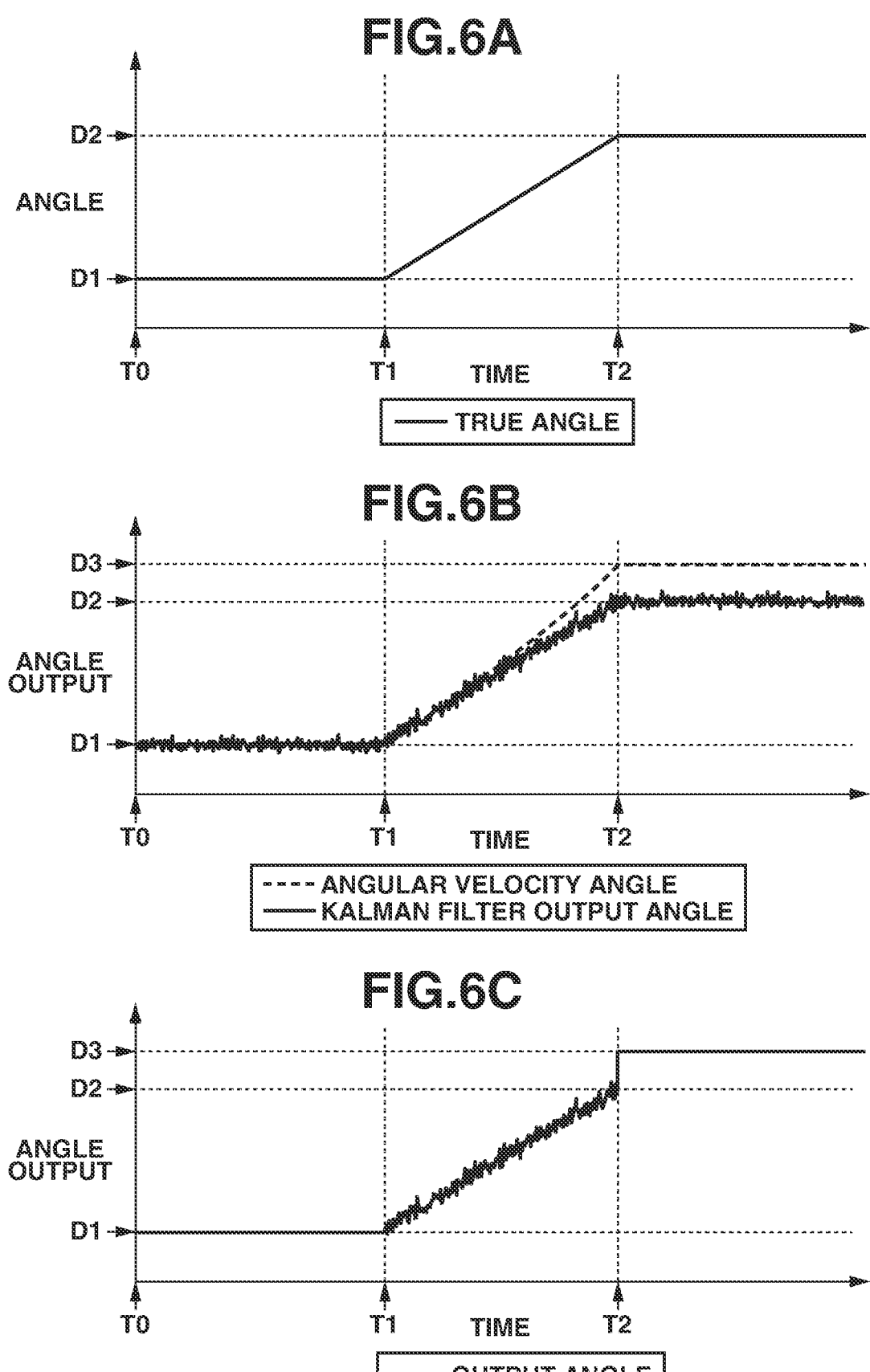
FIG. 6A is a graph illustrating an orientation of the camera according to the first exemplary embodiment.
FIG. 6B is a graph illustrating output signals in the orientation calculation unit according to the first exemplary embodiment.
FIG. 6C is a graph illustrating an output signal in the orientation calculation unit according to the first exemplary embodiment.

FIGS. 6A to 6C illustrate graphs in a case where errors are caused in the output orientation information ($\psi$, $\theta$, and $\phi$) in the first exemplary embodiment. In each graph, the horizontal axis represents time, and the vertical axis an orientation angle that is a yaw angle, a pitch angle, or a roll angle. FIG. 6A illustrates a graph of the orientation (true angle) of the camera 100. FIG. 6B illustrates a first angle signal (dashed line) as an output signal from the angular velocity angle calculation unit 206 and a second angle signal (solid line) as an output signal from the Kalman filter calculation unit 207, according the first exemplary embodiment. FIG. 6C illustrates a third angle signal as an output signal from the output determination unit 208 according to the first exemplary embodiment.

Further, the offset components included in an output from the angular velocity sensor 107 are assumed to continue varying due to change in temperature during the period illustrated in FIGS. 6A to 6C. In addition, the following is a description on the assumption that the changes in the offset components included in the output are completely removed by the offset calculation unit 204 and the offset subtractor 205.

The orientation of the camera 100 is at an angle of D1 at a timing T0. The orientation of the camera 100 does not change from the timing T0 to a timing T1 (stationary state), and changes at a certain speed from the timing T1 to a timing T2 up to an angle of D2 (nonstationary state). At and after the timing T2, the orientation of the camera 100 stays unchanged (stationary state).

The first angle signal as an orientation angle based on an angular velocity indicates an orientation angle of D1 with accuracy as the offset values in the angular velocity signals continue being updated by the offset calculation unit 204 during the period from the timing T0 to the timing T1. On the other hand, the offset values are not updated during the period from the timing T1 to the timing T2. As the time elapses, errors (offsets) in the low frequency in particular accumulate. At the timing T2, the first angle signal indicating an orientation angle of D3, which includes the accumulated errors with respect to an orientation angle of D2, a true value, is output. At and after the timing T2, the offset values continue being updated, which allows correction of the change in output due to the time elapse. However, the errors accumulated during the period from the timing T1 to the timing T2 are taken over, thereby causing the first angle signal indicating an orientation angle of D3, which includes the accumulated errors, to be output.

On the other hand, the second angle signal as an orientation angle obtained by correcting the first angle signal through the Kalman filter has high-frequency noise included in the acceleration signals and the geomagnetism signals at any timing during the period at and after the timing T0. The second angle signal however indicates an approximately accurate orientation angle as a result of the correction made to the changes in output due to the offset components included in the angular velocity signal.

The output determination unit 208 outputs the first angle signal based on the angular velocity during the period from the timing T0 to the timing T1 (stationary state). Subsequently, the output determination unit 208 outputs the second angle signal corrected based on the acceleration signals and geomagnetism signals during the period from the timing T1 to the timing T2 (nonstationary state), and then outputs the first angle signal again at and after the timing T2

(stationary state). Thus, during the period from the timing T0 to the timing T1, the output determination unit 208 can output an accurate orientation angle, and during the period from the timing T1 to the timing T2, the output determination unit 208 can output an approximately accurate orientation angle although some noise is included. However, the output signal is switched to the first angle signal at the timing T2, and at and after the timing T2, the first angle signal with the errors (D3–D2) resulting from the offset components generated during the period from the timing T1 to the timing T2 is output.

In the present exemplary embodiment, a description will be given of a form allowing reduction of errors generated at and after the timing T2, included in an output signal from the output determination unit 208.

A camera 100 according to the present exemplary embodiment will be described with reference to drawings. The camera 100 according to the present exemplary embodiment includes an orientation calculation unit 300 different from that of the camera 100 according to the first exemplary embodiment, but the other components are the same as those in the first exemplary embodiment. In short, the camera 100 according to the present exemplary embodiment includes the orientation calculation unit 300 in place of the orientation calculation unit 200 of FIG. 1.

Figure 7:
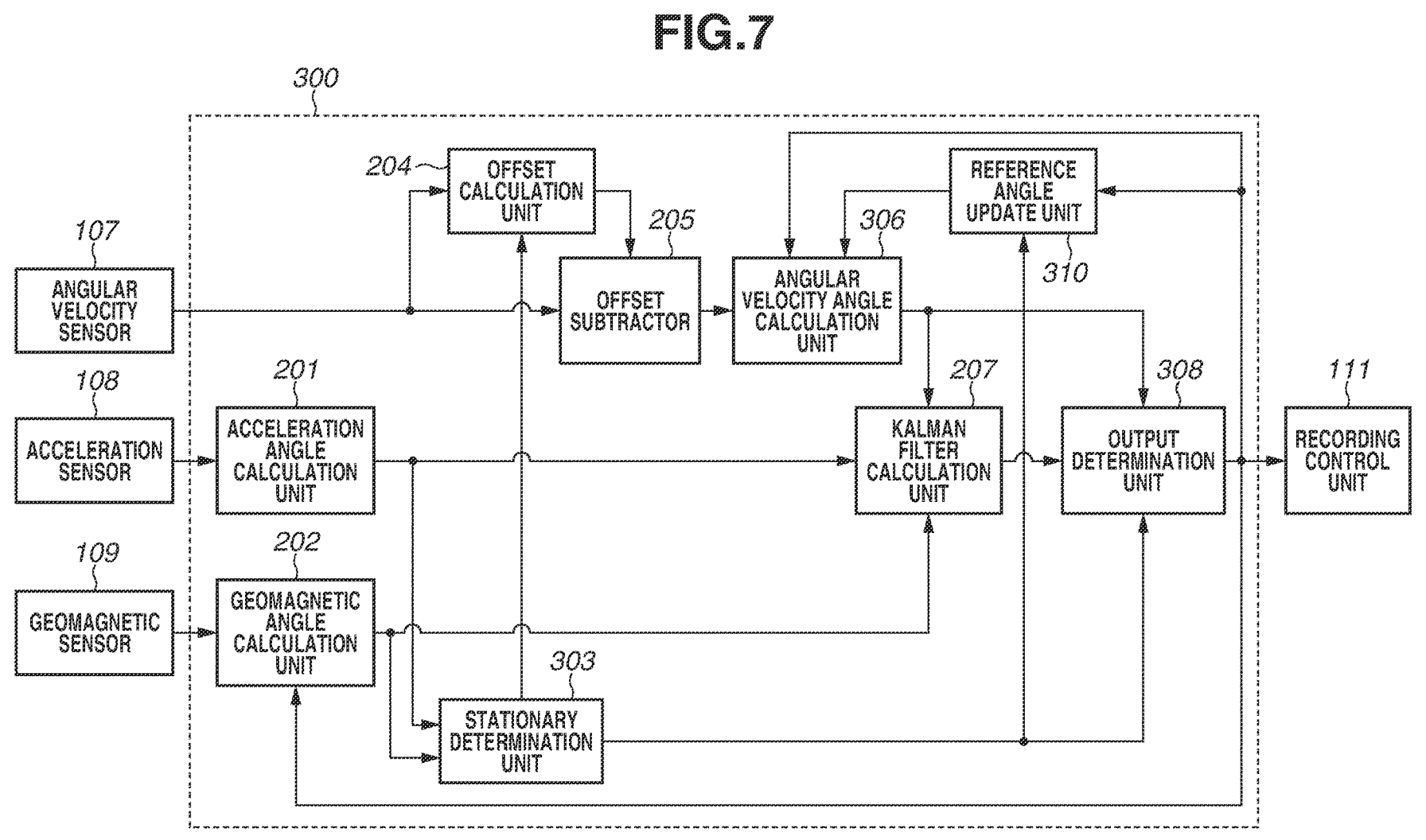

FIG. 7 is a block diagram illustrating details of the orientation calculation unit 300 according to the present exemplary embodiment.

Like numbers common to those in the orientation calculation unit 200 in FIG. 4 refer to like components, and a redundant description thereof will be omitted. The orientation calculation unit 300 differs largely from the orientation calculation unit 200 in that the orientation calculation unit 300 includes a reference angle update unit 310. The reference angle update unit 310 allows reduction of the errors in the low frequency (due to the offset components) even with the first angle signal switched from the second angle signal at the timing T2 as described above. The following is a detailed description.

A stationary determination unit 303 determines the stationary state of the camera 100 using the pitch angle $\theta_A$ and the roll angle $\phi_A$ output from the acceleration angle calculation unit 201 and the yaw angle $\psi_M$ output from the geomagnetic angle calculation unit 202, as with the stationary determination unit 203 according to the first exemplary embodiment. The stationary determination unit 303 outputs the determined result (stationary state/nonstationary state) to the offset calculation unit 204, an output determination unit 308, and also to the reference angle update unit 310, which differs from the case of the stationary determination unit 203. A method of the determination is similar to the method for the stationary determination unit 203.

An angular velocity angle calculation unit 306 calculates angles (orientation angles) in the absolute coordinate system from offset-corrected angular velocity signals output from the offset subtractor 205 and orientation angles output from the output determination unit 308, which will be described below, and then outputs the angles, as with the angular velocity angle calculation unit 206 according to the first exemplary embodiment. The angular velocity angle calculation unit 306 is different from the angular velocity angle calculation unit 206 according to the first exemplary embodiment in that there is a timing when the angular velocity angle calculation unit 306 outputs orientation angles based on angles based on outputs from the reference angle update unit 310, which will be described below. Specifically, if the reference angle update unit 310 updates reference angles, the reference angle update unit 310 replaces orientation angles $\psi_{G(t-1)}$, $\theta_{G(t-1)}$, and $\phi_{G(t-1)}$ based on angular velocity signals calculated by the angular velocity angle calculation unit 306 with reference angles $\psi_{Base}$, $\theta_{Base}$, and $\phi_{Base}$ output from the reference angle update unit 310. Thus, the first orientation angles equals the reference angles at the timing of updating reference angles. The method of calculating orientation angles at the other timings (e.g., the timings other than the timing of switching) is similar to the method for the angular velocity angle calculation unit 206 according to the first exemplary embodiment, and a redundant description will be omitted. The output determination unit 308 determines orientation angles ($\psi$, $\theta$, and $\phi$) to be output depending on the stationary determination result of the camera 100 made by the stationary determination unit 303, and outputs to the recording control unit 111, as with the angular velocity angle calculation unit 206 according to the first exemplary embodiment. The output determination unit 308 is different from the output determination unit 208 according the first exemplary embodiment in that the output determination unit 308 outputs the orientation angles ($\psi$, $\theta$, and $\phi$) also to the reference angle update unit 310, which will be described below.

The reference angle update unit 310 updates the reference angles $\psi_{Base}$, $\theta_{Base}$, and $\phi_{Base}$ at a timing (T2) when the orientation information output from the output determination unit 308 is switched from the second orientation information to the first orientation information, and outputs the updated reference angles to the angular velocity angle calculation unit 306.

According to the present exemplary embodiment, the timing when the second orientation information is switched to the first orientation information is a timing when the stationary determination result made by the stationary determination unit 303 switches from the nonstationary state to the stationary state. The reference angle update unit 310 thus updates the reference angles $\psi_{Base}$, $\theta_{Base}$, and $\phi_{Base}$ depending on the stationary determination result of the camera 100 made by the stationary determination unit 303, and outputs the updated reference angles to the angular velocity angle calculation unit 306. The reference angle update unit 310 updates the reference angles as a timing when the stationary determination result made by the stationary determination unit 303 switches from the nonstationary state to the stationary state. The reference angles to be updated are calculated based on the third orientation information ($\psi$, $\theta$, and $\phi$) output from the output determination unit 308. For example, the reference angles are averages of the third orientation information ($\psi$, $\theta$, and $\phi$) during a predetermined period until a timing when it is determined that the nonstationary state is switched to the stationary state. The reference angles may be calculated after the determination of switching to the stationary state, which causes a time lag. It is more desirable to calculate the reference angles in advance. Further, instead of taking the averages, the effect of noise in the high-frequency may be reduced by processing through a low-pass filter or the like. Thus, using the averages or a low-pass filter, orientation angles less affected by noise in the high-frequency than the second orientation information can be used as the reference angles.

Figure 8:
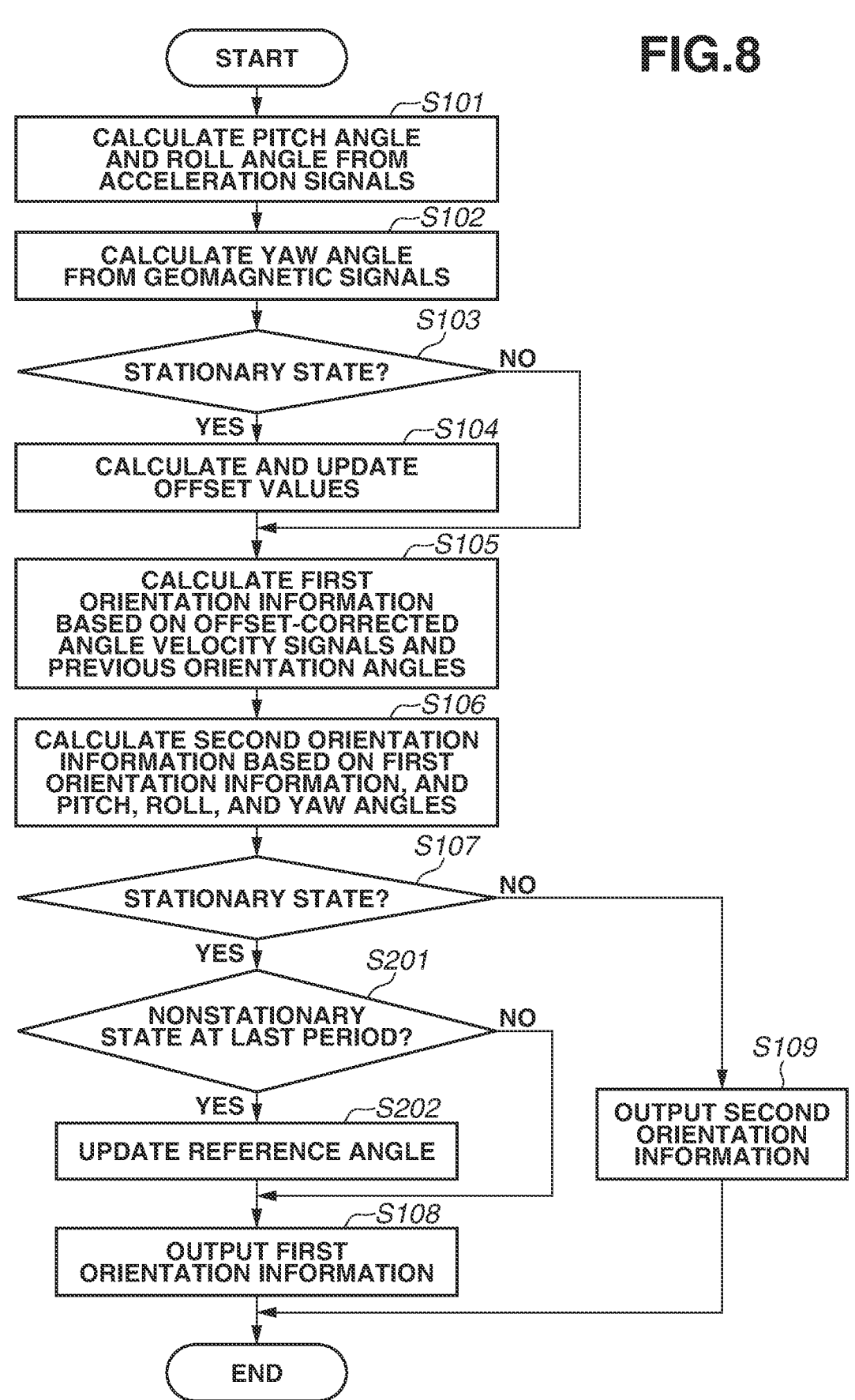
FIG. 8 is a flowchart illustrating processing by the orientation calculation unit according to the second exemplary embodiment.

FIG. 8 is a flowchart illustrating a procedure of calculating orientation information in the orientation calculation unit 300. The processing is repeated every a predetermined period. Steps common to those in the first exemplary embodiment described in FIG. 5 are denoted by the same numbers, and a redundant description will be omitted.

The processing from steps S101 to S107 and in S109, which is processing to be performed in the case of determining to be the nonstationary state, are common to those in the first exemplary embodiment.

In the present exemplary embodiment, if the determination result indicates that the camera 100 is in the stationary state (YES in step S107), the processing proceeds to step S201. In step S201, the stationary determination unit 303 determines whether the determination result made by the stationary determination unit 303 at the last period (t−1) in the processing in the flowchart performed repeatedly (e.g., the results in steps S103 and S107 at the last period) indicates that the camera 100 was in the nonstationary state. If the determination result indicates that the camera 100 was in the nonstationary state (YES in step S202), the processing proceeds to step S202. If the determination result indicates that the camera 100 was not in the nonstationary state (e.g., the stationary state has continued since the last time), the processing proceeds to step S108.

In step S202, the reference angle update unit 310 updates the reference angles. When the determination result at the last period indicates that the camera 100 was in the nonstationary state, the current timing is the timing of switching from the nonstationary state to the stationary state, indicated with T2 in FIGS. 6A to 6C. As described above, if the current timing is determined to be the timing of switching from the nonstationary state to the stationary state, the output determination unit 308 switches the signals to be output from the second orientation information to the first orientation information. The reference angle update unit 310 updates the reference angles to new reference angles based on the past third orientation information accordingly, as described above. This makes the first orientation information output at the current period based on the second orientation information, thereby reducing the effect of the offset components generated during the nonstationary state (from the timing T1 to the timing T2) included in the first orientation information. After the update of the reference angles performed by the reference angle update unit 310 is completed, the processing proceeds to step S108. In step S108, the output determination unit 308 outputs the first orientation information, as in the first exemplary embodiment. In steps S201 to S108, after it is determined that the output by the output determination unit 308 is to switch from the second orientation information to the first orientation information (in step S201), the reference angles are updated by the time that the switching to the orientation information to be actually output is performed (in step S108).

At the subsequent periods (at and after t+1), the first orientation information is calculated as in the first exemplary embodiment, and the calculated first orientation information is output without being replaced with the reference angles.

In this case, the orientation angles are calculated based on the angles (D2) less affected by the offset components, and thus the first orientation information at and after the next period is calculated with a less effect of the offset components.

Figures 9A, 9B, 9C:
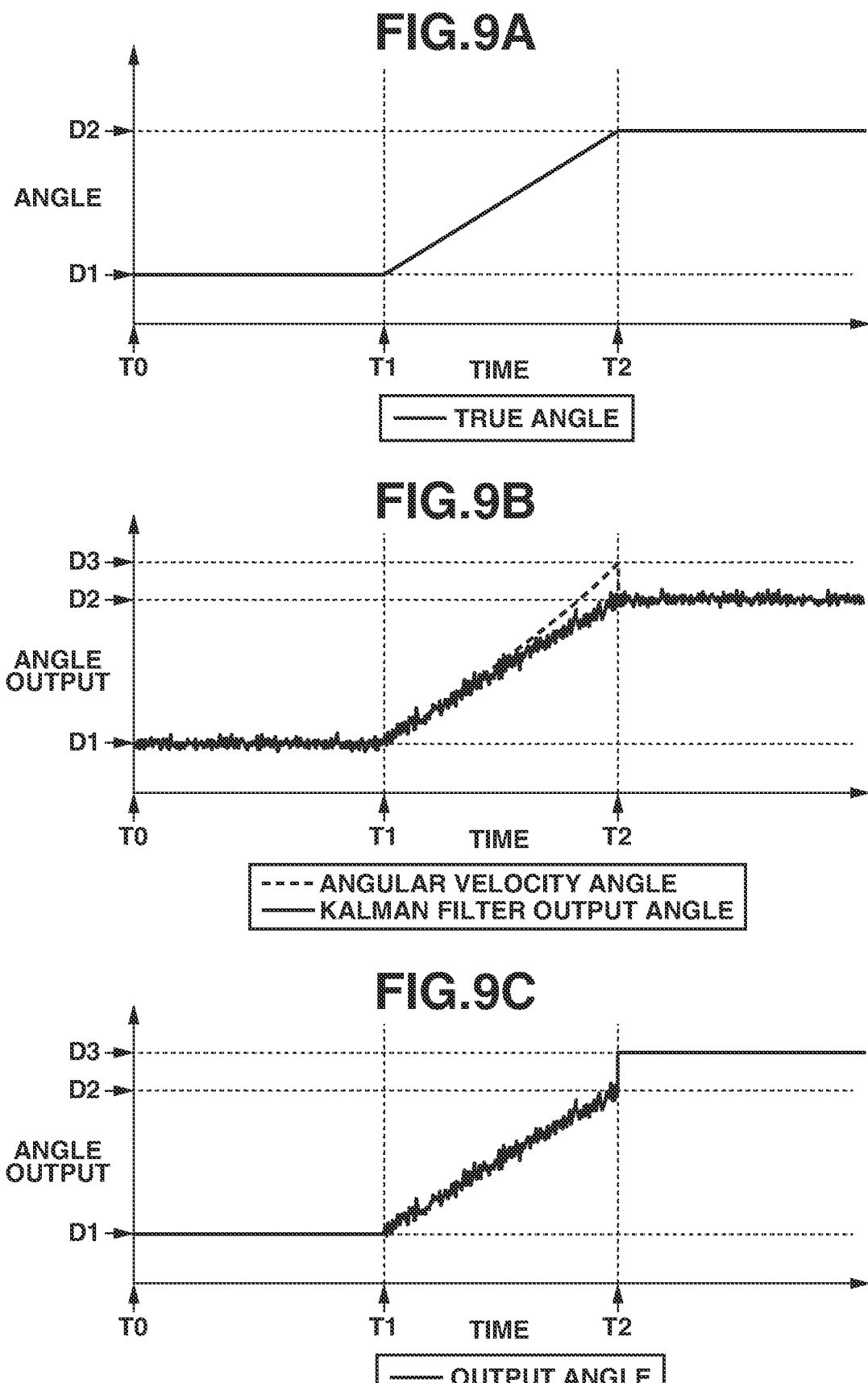
FIG. 9A is a graph illustrating an orientation of the camera according to the second exemplary embodiment.
FIG. 9B is a graph illustrating output signals in the orientation calculation unit according to the second exemplary embodiment.
FIG. 9C is a graph illustrating an output signal in the orientation calculation unit according to the second exemplary embodiment.

In FIGS. 9A to 9C, the graphs illustrate the achievement of a lessened effect of errors included in the orientation information to be output according to the present exemplary embodiment. The horizontal axis represents time, and the vertical axis an orientation angle that is a yaw angle, a pitch angle, or a roll angle.

FIG. 9A is a graph illustrating the orientation of the camera 100 (true value).

FIG. 9B illustrates the first angle signal (dashed line) as the output signal from the angular velocity angle calculation unit 206 and the second angle signal (solid line) as the output signal form the Kalman filter calculation unit 207, according the present exemplary embodiment.

FIG. 9C illustrates the third angle signal as the output signal from the output determination unit 308 according to the present exemplary embodiment.

Further, the offset components included in the output from the angular velocity sensor 107 are assumed to continue varying due to change in temperature during the period illustrated in FIGS. 9A to 9C. As in FIGS. 6A to 6C, the following is a description on the assumption that the changes in the offset components included in the output are completely removed by the offset calculation unit 204 and the offset subtractor 205.

The orientation of the camera 100 is at an angle of D1 at the timing T0. The orientation of the camera 100 does not change from the timing T0 to the timing T1 (stationary state), and changes at a certain speed from the timing T1 to the timing T2 up to an angle of D2 (nonstationary state). At and after the timing T2, the orientation of the camera 100 stays unchanged (stationary state).

The first angle signal as an orientation angle based on an angular velocity indicates an orientation angle of D1 with accuracy as the offset values in the angular velocity signals continue being updated by the offset calculation unit 204 during the period from the timing T0 to the timing T1. On the other hand, the offset values are not updated during the period from the timing T1 to the timing T2. As the time elapses, errors (offsets) in the low frequency in particular accumulate. At the timing T2, the first angle signal indicating an orientation angle of D3, which includes the accumulated errors with respect to an orientation angle of D2, a true value, is output. Immediately after the timing T2, in response to when it is determined that the state of the camera 100 has changed from the nonstationary state to the stationary state, the reference angles are updated in step S202. Thus, the value of the first angle signal is replaced with the angle D2, which is a correct orientation angle. At and after the timing T2, the offset update is performed, with no change in output with time. The first angle signal indicating the correct orientation angle D2 is therefore output.

On the other hand, the second angle signal as an orientation angle obtained by correcting the first angle signal through the Kalman filter has high-frequency noise included in the acceleration signals and the geomagnetism signals at any timing during the period at and after the timing T0. The second angle signal however indicates an approximately accurate orientation angle because the changes in output due to the offset components included in the second signal are corrected.

The output determination unit 308 outputs the first angle signal based on an angular velocity during the period from the timing T0 to the timing T1 (stationary state). During the period from the timing T1 to the timing T2 (nonstationary state), the second angle signal, which is obtained by correcting the first angle signal based on an angular velocity through the Kalman filter and the other sensor outputs, is output, and at and after the timing T2 (nonstationary state), the first angle signal is output again. This configuration allows an accurate orientation angle to be output during the period from the timing T0 to the timing T1 and the period at and after the timing T2 and an approximately accurate orientation angle to be output during the period from the timing T1 to the timing T2 although affected by noise in the high frequency.

As described above, according to the present exemplary embodiment, the orientation angle of a camera can be calculated with reduction of the effect of the high frequency noise included in an acceleration sensor and a geomagnetic sensor and accurate correction of the effect of errors in the low frequency included in an angular velocity sensor due to temperature or other sources. Furthermore, errors generated in switching the method of calculation of the orientation information can be reduced.

Modifications

In the foregoing exemplary embodiment, a method for calculating the orientation of the camera 100 as relative angles with respect to the initial angles has been described, with the state where the optical axis of the imaging lens 101 falls on the $Z_O$ axis and the horizontal direction of the camera main body falls on the $X_O$ axis as the zero angles. However, the orientation to be set as the zero angles is not limited in particular. For example, a state with some tilt in the pitch angle may be set as the zero angles.

In the foregoing exemplary embodiment, the angular velocity sensor 107 is described to be a first sensor of which error components in the low frequency or variations in the error components are greater and noise components in the high frequency band are smaller than those of a second sensor.

The acceleration sensor 108 and the geomagnetic sensor 109 are described to be second sensors of which error components in the low frequency band or variations in the error components are smaller and noise components in the high frequency band are greater than those of the first sensor. However, the sensors to be used are not limited thereto. If other sensors capable of obtaining angle information are used, one of the sensors of which error components in the low frequency band or variations in the error components are relatively large and noise components in the high frequency band are relatively small is substituted for the angular velocity sensor 107 according to the foregoing exemplary embodiment. Sensors of which error components in the low frequency band or variations in the error components are relatively small and noise components in the high frequency band are relatively large are substituted for the acceleration sensor 108 and the geomagnetic sensor 109 according to the foregoing exemplary embodiment. Orientation information can thereby be calculated in a similar manner to in the foregoing exemplary embodiment.

In the foregoing exemplary embodiment, which to use as the orientation information about the camera 100, the orientation information calculated by the first calculation unit or the orientation information calculated by the second calculation unit, is selected based on whether the camera 100 is stationary. However, some embodiments are not limited thereto. Suppose, for example, that the camera 100 is not stationary in a strict sense but moving so slightly that the orientation calculated based on the output of the angular velocity sensor 107 is considered to be rather higher in accuracy. The orientation calculation units 200 and 300 may be configured so that the first orientation information is output as the orientation information about the camera 100 in such a case. In other words, the orientation calculation units 200 and 300 may output the first orientation information as the orientation information about the camera 100 if the movement of the camera 100 is in a first state. Here, the first state may refer to either where the camera 100 is stationary or where the camera 100 is moving only slightly as described above. Likewise, if the first orientation information is output as the camera orientation information in a second state, the second state may exclude the state where the camera 100 is moving slightly.

According to the second exemplary embodiment, the method of calculating the orientation information switches as the stationary determination result switches. The update of the reference angles is performed at a timing at which a stationary determination result switches from the nonstationary state to the stationary state. However, some embodiments are not limited thereto. The calculation method may be changed between the first state where the camera 100 is in the stationary state or moving slightly and a state other than the first state, or changed based on information about something other than the movement. Even if the calculation method switches based on information other than information about the stationary state, the update of the reference angles is performed in synchronization with this switching timing.

In the foregoing exemplary embodiment, the camera 100 that is an imaging apparatus is described to include the orientation calculation apparatus. However, the orientation calculation apparatus is not limited thereto. A moving apparatus for the orientation calculation apparatus to calculate the orientation of is not limited to an imaging apparatus, either.

For example, an orientation calculation apparatus that has the functions of the foregoing exemplary embodiment and functions as a tilt angle detection apparatus for calculating a tilt angle as the orientation of a vehicle body is also included in some embodiments. As employed in the present exemplary embodiment and this specification, a moving apparatus refers to not only a moving body that includes a driving unit and can move by itself (including vehicles such as an automobile and a train car, and aircraft such as a drone), but also a portable apparatus of which orientation can be changed by the user or a moving body. Specific examples other than the imaging apparatus include a mobile phone (smartphone), a tablet, a personal computer, a head-mounted display, and smartglasses.

The orientation calculation apparatus does not necessarily need to be implemented in the moving apparatus. The orientation calculation apparatus may be installed at a position away from the moving apparatus and configured to not move integrally with the moving apparatus as long as the orientation calculation apparatus can receive the detection signals from the various sensors disposed in the moving apparatus. The orientation calculation apparatus may be configured so that the detection signals can be received or obtained using wired or wireless communication.

In the foregoing exemplary embodiment, the Kalman filter calculation unit 207 calculates the second orientation information even if the camera 100 is in the stationary state. However, if the camera 100 is in the stationary state and the output determination unit 208 selects the output of the angular velocity angle calculation unit 206 as the output from the orientation calculation unit 200, the calculation of the second orientation information by the Kalman filter calculation unit 207 may be temporarily suspended.

For example, step S106 of calculating the second orientation information ($\psi_K$, $\theta_K$, and $\varphi_K$) may be performed after the camera 100 is determined to not be in the stationary state in step S107.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While embodiments have been described above in detail, some embodiments are not limited to such specific exemplary embodiments, and various modes not departing from the gist of this disclosure are also included in some embodiments. Some of the foregoing exemplary embodiments may be combined as appropriate.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-102632, which was filed on Jun. 27, 2022 and which is hereby incorporated by reference herein in its entirety.

What is claimed is:

1. An orientation calculation apparatus comprising:
one or more memories; and
one or more processors,
wherein the one or more processors and the one or more memories are configured to:
obtain detection signals from a first sensor configured to detect movement of a moving apparatus and a second sensor configured to detect the movement of the moving apparatus on a same axis as that of the movement detected by the first sensor;
calculate, as a first calculation, first orientation information about the moving apparatus based on an output of the first sensor and a reference angle;
calculate, as a second calculation, second orientation information about the moving apparatus by a method different from that for the first calculation based on the output of the first sensor and an output of the second sensor;
determine which calculation to compute an orientation of the moving apparatus is to be used, from among a plurality of calculations including the first calculation and the second calculation, as a determination; and
update the reference angle, wherein the reference angle is updated in synchronization with a timing when the one or more processors and the one or more memories determine that a state where the determination is to be switched from a state where the orientation of the moving apparatus is calculated using the second calculation to a state where the orientation of the moving apparatus is calculated using the first calculation.

2. The orientation calculation apparatus according to claim 1, wherein the one or more processors and the one or more memories are further configured to update the reference angle at a timing of the switching.

3. The orientation calculation apparatus according to claim 2, wherein the one or more processors and the one or more memories are further configured to update the reference angle before the switching is performed after the determination of the switching.

4. The orientation calculation apparatus according to claim 2, wherein the one or more processors and the one or more memories are further configured to not update the reference angle at any timing but the timing of the switching.

5. The orientation calculation apparatus according to claim 1, wherein the one or more processors and the one or more memories are further configured to calculate the reference angle based on an average of the second orientation information, and update the reference angle to the calculated reference angle at the timing.

6. The orientation calculation apparatus according to claim 5, wherein the one or more processors and the one or more memories are further configured to calculate the reference angle based on the average of the second orientation information during a predetermined period until the timing.

7. The orientation calculation apparatus according to claim 1, wherein the one or more processors and the one or more memories are further configured to:

determine a state of movement of the moving apparatus based on the output of the second sensor, and with the state of movement of the moving apparatus obtained based on the output of the second sensor determined to be a first state, determine the first orientation information to be information indicating the orientation of the moving apparatus, and with the state of movement of the moving apparatus obtained based on the output of the second sensor determined to be a second state where the movement is greater than in the first state, determine the second orientation information to be the information indicating the orientation of the moving apparatus.

8. The orientation calculation apparatus according to claim 1, wherein the one or more processors and the one or more memories are further configured to determine a state of the movement of the moving apparatus based on the output of the second sensor, and update the reference angle in synchronization with a timing when the state of the movement of the moving apparatus obtained based on the output of the second sensor changes from a second state to a first state where the movement of the moving apparatus is smaller than that in the second state.

9. The orientation calculation apparatus according to claim 1, wherein the first orientation information and the second orientation information each include angle information about a yaw angle, a pitch angle, and a roll angle of the moving apparatus with respect to a predetermined orientation.

10. The orientation calculation apparatus according to claim 1, wherein the first sensor is configured to detect the movement of the moving apparatus on three axes, and wherein the second sensor is configured to detect the movement of the moving apparatus on three axes.

11. The orientation calculation apparatus according to claim 1, wherein the one or more processors and the one or more memories are further configured to calculate the second orientation information by inputting a signal based on the output of the first sensor and a signal based on the output of the second sensor to a Kalman filter.

12. The orientation calculation apparatus according to claim 1, wherein the one or more processors and the one or more memories are further configured to calculate the first orientation information based on a signal obtained by applying low-pass filter processing to the output of the first sensor.

13. The orientation calculation apparatus according to claim 1, wherein the one or more processors and the one or more memories are further configured to calculate the first orientation information based on a signal obtained by subtracting an average of the output of the first sensor in a predetermined period from the output of the first sensor.

14. The orientation calculation apparatus according to claim 1, wherein the first sensor is an angular velocity sensor configured to detect angular velocity of the movement of the moving apparatus, and wherein the second sensor is at least either an acceleration sensor configured to detect acceleration of the movement of the moving apparatus or a geomagnetic sensor configured to detect a change in a direction of the moving apparatus.

15. The orientation calculation apparatus according to claim 14, wherein the first orientation information and the second orientation information each indicate a yaw angle, a pitch angle, and a roll angle of the moving apparatus, wherein the second sensor includes the geomagnetic sensor and the acceleration sensor, and wherein the one or more processors and the one or more memories are further configured to calculate the yaw angle based on an output of the geomagnetic sensor and an output of the angular velocity sensor, and calculate the pitch angle and the roll angle based on an output of the acceleration sensor and the output of the angular velocity sensor.

16. An imaging apparatus comprising:

an image sensor configured to capture an object image formed by an imaging optical system;

one or more memories; and one or more processors, wherein the one or more processors and the one or more memories are configured to:

obtain detection signals from a first sensor configured to detect movement of the imaging apparatus and a second sensor configured to detect the movement of the imaging apparatus on a same axis as that of the movement detected by the first sensor;

calculate, as a first calculation, first orientation information about the imaging apparatus based on an output of the first sensor and a reference angle;

calculate, as a second calculation, second orientation information about the imaging apparatus by a method different from that for calculating the first orientation information based on the output of the first sensor and an output of the second sensor;

determine which calculation to compute an orientation of the imaging apparatus is to be used, from among a plurality of calculations including the first calculation and the second calculation, as a determination; and update the reference angle, wherein the reference angle is updated in synchronization with a timing when the one or more processors and the one or more memories determine that a state where the determination is to be switched from a state where the orientation of the imaging apparatus is calculated using the second calculation to a state where the orientation of the imaging apparatus is calculated using the first calculation.

17. The imaging apparatus according to claim 16, wherein the one or more processors and the one or more memories are further configured to control recording of an image signal output by the image sensor, and record the first orientation information or the second orientation information that is determined, by the determination, to be used for calculating the orientation of the imaging apparatus and record the image signal in synchronization with each other.

18. The imaging apparatus according to claim 16, further comprising the first sensor and the second sensor.

19. A moving body comprising:

a driving unit;

one or more memories; and one or more processors, wherein the one or more processors and the one or more memories are configured to:

obtain detection signals from a first sensor configured to detect movement of the moving body and a second sensor configured to detect the movement of the moving body on a same axis as that of the movement detected by the first sensor;

calculate, as a first calculation, first orientation information about the moving body based on an output of the first sensor and a reference angle;

calculate, as a second calculation, second orientation information about the moving body by a method different from that for calculating the first orientation information based on the output of the first sensor and an output of the second sensor;

determine which calculation to compute an orientation of the moving body is to be used, from among a plurality of calculations including the first calculation and the second calculation, as a determination; and update the reference angle, wherein the reference angle is updated in synchronization with a timing when the one or more processors and the one or more memories determine that a state where the determination is to be switched from a state where the orientation of the moving body is calculated using the second calculation to a state where the orientation of the imaging apparatus is calculated using the first calculation.

20. A method for controlling an orientation calculation apparatus configured to calculate information indicating an orientation of a moving apparatus, the method comprising:

obtaining detection signals from a first sensor configured to detect movement of the moving apparatus and a second sensor configured to detect the movement of the moving apparatus on a same axis as that of the movement detected by the first sensor;

calculating information indicating a first orientation of the moving apparatus as a first calculation based on an output of the first sensor and a reference angle;

calculating information indicating a second orientation of the moving apparatus as a second calculation by a method different from that for the first calculation based on the output of the first sensor and an output of the second sensor;

determining which calculation to compute an orientation of the moving apparatus is to be used, from among a plurality of calculations including the first calculation and the second calculation, as a determination; and updating the reference angle as a reference angle update, wherein the reference angle update is performed in synchronization with a timing when it is determined by the determination that a state where the orientation of the moving apparatus is calculated using the second calculation is to be switched to a state where the orientation of the moving apparatus is calculated using the first calculation.

* * * * *